Dec. 19, 1961 C. L. DUNHAM 3,013,749
AIRCRAFT STRUCTURE
Filed Sept. 25, 1959 2 Sheets-Sheet 1
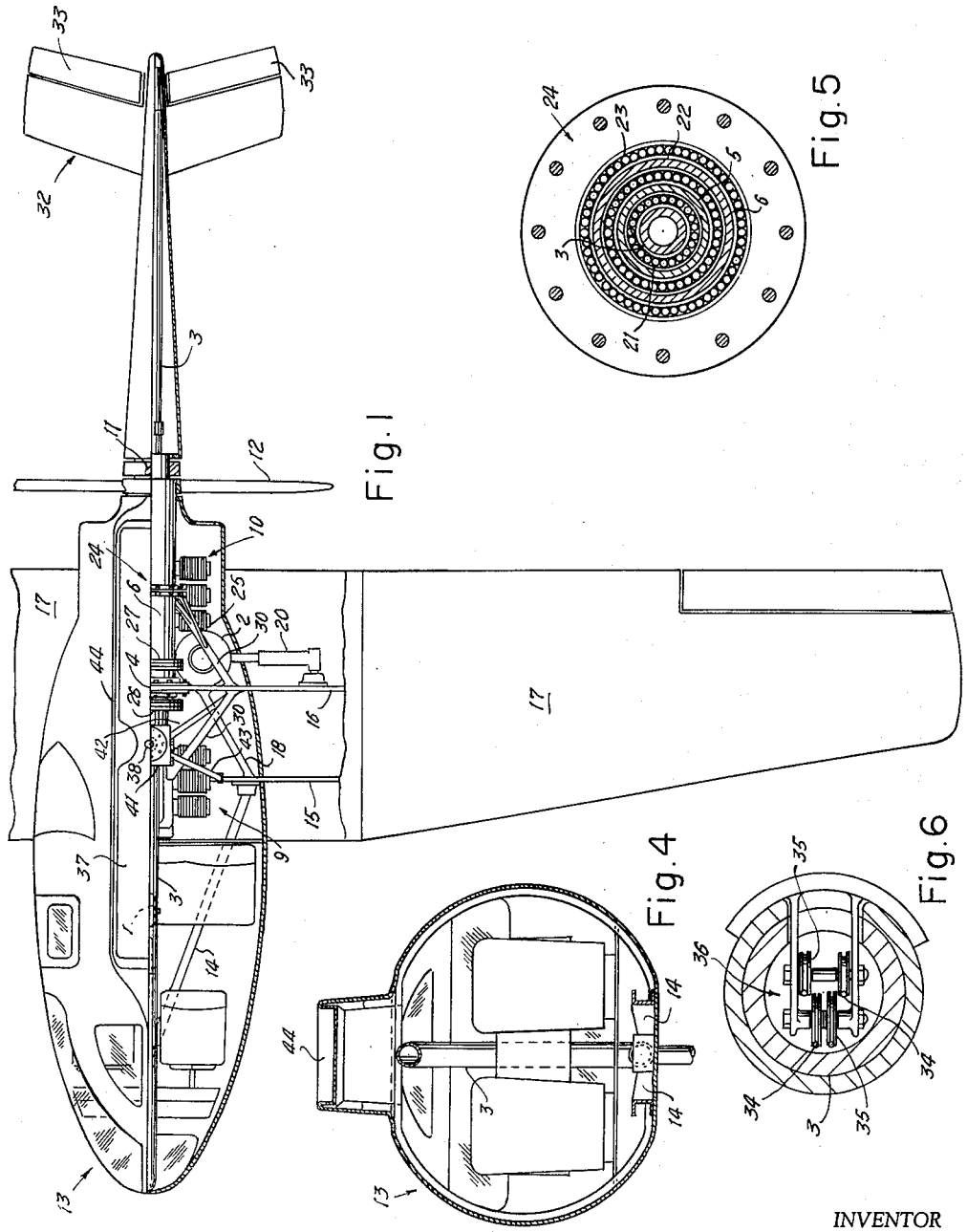
INVENTOR
Charles L. Dunham
BY *Cecil L. Wood*
ATTORNEY Dec. 19, 1961  C. L. DUNHAM  3,013,749
AIRCRAFT STRUCTURE
Filed Sept. 25, 1959  2 Sheets-Sheet 2
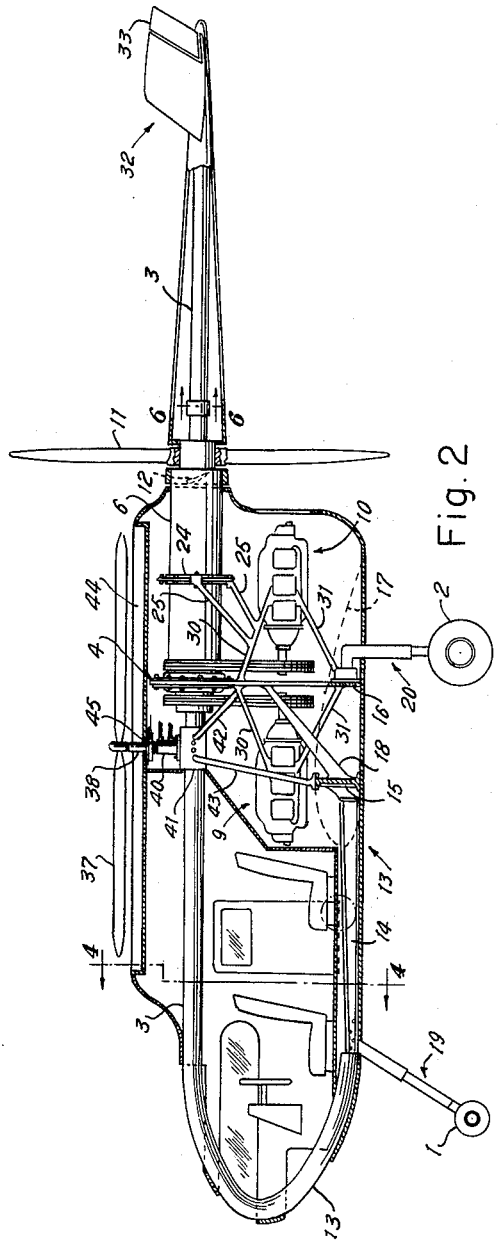
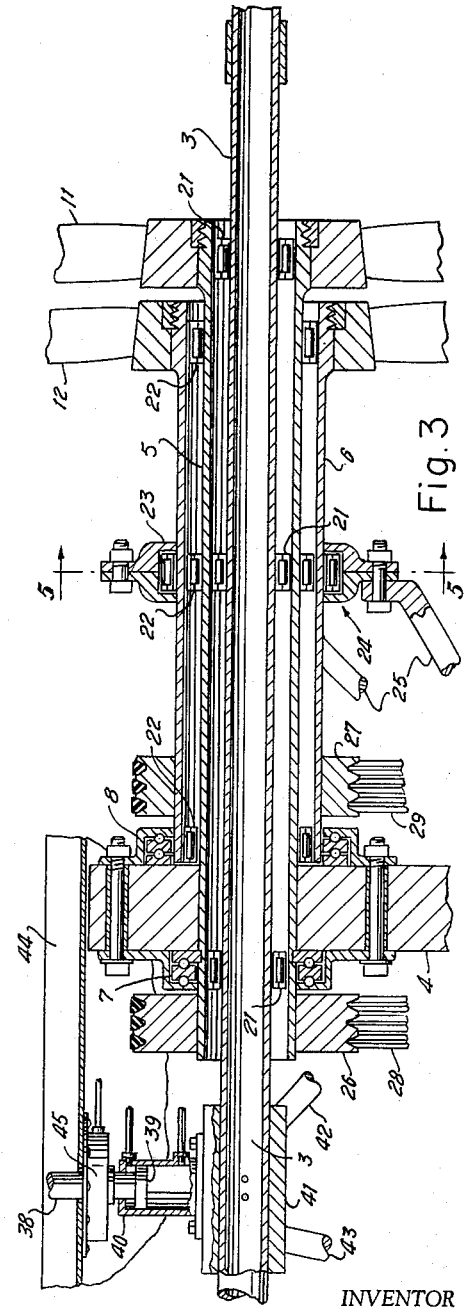
INVENTOR
Charles L. Dunham
BY Cecil L. Wood
ATTORNEY

United States Patent Office 3,013,749
Patented Dec. 19, 1961

3,013,749
AIRCRAFT STRUCTURE
Charles L. Dunham, 2816 Westridge, Fort Worth, Tex.
Filed Sept. 25, 1959, Ser. No. 842,380
1 Claim. (Cl. 244—65)

This invention relates to an aircraft structure, and it concerns more particularly a propeller driven airplane of the autogyro type.

An object of the invention is to provide an airplane having a pair of pusher type propellers positioned rearwardly of and between the wings and rotatable in opposite directions about a common horizontal axis.

Another object of the invention is to provide an airplane having, in combination with a pair of pusher type propellers positioned rearwardly of and between the wings and rotatable in opposite directions about a common horizontal axis, a vertically retractable, freely turning propeller above the fuselage which, in its upwardly extended position, is rotatable about a vertical axis in response to the flow of air counter to the forward movement of the plane, whereby the plane is additionally supported in flight.

Another object of the invention is to provide an airplane having a frame and retractable landing gear mounted on the frame, the frame including a principal structural member consisting of an elongated tube extending longitudinally of the plane, centrally thereof, a thrust plate incorporated in the frame structure and arranied transversely of the tube, intermediate its ends, the thrust plate having an opening therein surrounding the tube and being spaced radially apart therefrom, a pair of concentric, tubular propeller shafts surrounding the tube intermediate its ends and having bearing means supporting them on the frame for rotative movement in opposite directions, the ends of one of the propeller shafts extending beyond the adjacent ends of the other propeller shaft and said one of the propeller shafts extending through the opening of the thrust plate, the thrust plate having thrust bearings on opposite sides thereof coacting with the respective propeller shafts whereby longitudinal thrust is adapted to be imparted to the thrust plate from the propeller shafts, an engine having means drivingly connecting it to each of the propeller shafts, forwardly thereof, whereby the propeller shafts are adapted to be rotated in opposite directions, and a propeller mounted on each of the propeller shafts, rearwardly thereof.

Another object of the invention is to provide an airplane as described in which the portion of the tube which is positioned forwardly of the propellers is enclosed within the fuselage of the plane, and in which the tube is turned downwardly and rearwardly along the inner wall of the fuselage adjacent its forward end and conforms to the contour thereof.

Another object of the invention is to provide an airplane as described in which the bearing means supporting the propeller shafts on the frame for rotative movement in opposite directions comprises bearings adjacent opposite ends of one of the propeller shafts, and intermediate the ends thereof, supporting it on the tube for rotative movement relative thereto, bearings adjacent opposite ends of the other of the propeller shafts, and intermediate the ends thereof, supporting it on said one of the propeller shafts for rotative movement relative thereto, and bearings intermediate the ends of the last mentioned propeller shaft rotatably supporting it on structural members incorporated in the frame whereby the structure is additionally reenforced.

Another object of the invention is to provide, in an airplane as described, separate engines each having means drivingly connecting it to one of the propeller shafts, forwardly thereof, whereby the propeller shafts are adapted to be rotated in opposite directions, the engines being positioned on opposite sides of the thrust plate and being supported on structural members incorporated in the frame.

Another object of the invention is to provide an airplane as described having a tail structure, including flaps whereby the flight of the plane is adapted to be controlled, mounted on the tube, rearwardly thereof, and having cables controlling the action of the tail flaps arranged within the tube and extending forwardly from the tail structure.

Another object of the invention is to provide an airplane as described in which a vertically retractable, freely turning propeller is positioned above the fuselage and is rotatable on a shaft having the elongated tube, which comprises the principal structural member of the frame, suspended therefrom, the last mentioned propeller, in its upwardly extended position, being rotatable about a vertical axis in response to the flow of air counter to the forward movement of the plane, whereby the plane is additionally supported in flight.

Another object of the invention is to provide an airplane as described in which the vertically retractable propeller is received in a recessed portion of the fuselage of the plane in its retracted position.

An advantageous feature of the invention is that all of the longitudinal thrust which is applied to the propeller shafts by the action of the propellers is imparted to the thrust plate, which is incorporated in the frame structure and is arranged transversely of the elongated tube which comprises the principal structural member thereof.

The arrangement above described results in a substantial reduction of the amount of reenforcing which is required to properly support the wings, to prevent them from collapsing or shearing off, as compared to airplane structures in which the engines are mounted on the wings, whereby considerable stress is applied thereto.

Another advantageous feature of the invention is that the vertically retractable, freely turning propeller, which additionally supports the plane in flight, permits the plane to be flown at lower speeds upon landing and taking off.

The invention will be readily understood by referring to the following description and the accompanying drawing, in which:

FIGURE 1 is a fragmentary top plan view, partly broken away, of an airplane embodying the invention;

FIGURE 2 is a longitudinal elevational view, partly broken away;

FIGURE 3 is a fragmentary longitudinal elevational view, on an enlarged scale, partly in section taken on a median line;

FIGURE 4 is a sectional elevational view taken on the line 4—4 of FIGURE 2;

FIGURE 5 is a sectional elevational view taken on the line 5—5 of FIGURE 3; and

FIGURE 6 is a sectional elevational view taken on the line 6—6 of FIGURE 2.

Referring to the drawing, the airplane of the invention has a frame as hereinafter described, and has retractable, tricycle type landing gear, comprising a front wheel 1 and a pair of rear wheels 2, mounted on the frame whereby the plane is adapted to be supported upon landing and taking off.

The frame includes a principal structural member consisting of an elongated tube 3, which extends longitudinally of the plane, centrally thereof. A thrust plate 4 is incorporated in the frame structure, and is arranged transversely of the tube 3, intermediate its ends. The thrust plate 4 has an opening therein surrounding the tube 3, and is spaced radially apart therefrom.

A pair of concentric, tubular propeller shafts 5 and 6 surround the tube 3 intermediate its ends, and have bearing means as hereinafter described supporting them on the frame for rotative movement in opposite directions. The ends of the inner propeller shaft 5 extend beyond the adjacent ends of the outer propeller shaft 6, and the inner propeller shaft 5 extends through the opening of the thrust plate 4.

The thrust plate 4 has thrust bearings 7 and 8 on opposite sides thereof coacting with the propeller shafts 5 and 6, respectively, whereby longitudinal thrust is adapted to be imparted to the thrust plate 4 from the propeller shafts 5 and 6.

A pair of engines 9 and 10 are drivingly connected, by means hereinafter described, to the propeller shafts 5 and 6, respectively, forwardly thereof, whereby the propeller shafts 5 and 6 are adapted to be rotated in opposite directions. A pair of propellers 11 and 12 are mounted on the propeller shafts 5 and 6, respectively, rearwardly thereof.

The portion of the tube 3 which is positioned forwardly of the propellers 11 and 12 is enclosed within the fuselage of the plane, indicated generally by the numeral 13. The tube 3 is turned downwardly and rearwardly along the inner wall of the fuselage 13 adjacent its forward end, and conforms to the contour thereof.

The lower end of the tube 3 is connected to the front ends of a pair of forwardly converging, horizontally disposed beams 14. The rear ends of the beams 14 are connected to a transverse beam 15, which with the transverse beam 16 extends horizontally outwardly along the wings of the plane, indicated by the numerals 17. The transverse beam 16 is connected to the thrust plate 4, which is also connected, by struts 18, to the transverse beam 15.

The retractable support for the front wheel 1, indicated by the numeral 19, is pivotally connected to the tube 3 at its juncture with the forwardly converging beams 14, and in its retracted position is received in a recess therefor between the beams 14.

The retractable supports for the rear wheels 2, indicated by the numerals 20, are pivotally connected to outboard portions of the transverse beam 16, and in their retracted positions are received in recesses therefor in the under side of the fuselage 13.

Bearings 21, which are positioned adjacent opposite ends of the inner propeller shaft 5, and intermediate the ends thereof, support the inner propeller shaft 5 on the tube 3 for rotative movement relative thereto. Bearings 22, which are positioned adjacent opposite ends of the outer propeller shaft 6, and intermediate the ends thereof, support the outer propeller shaft 6 on the inner propeller shaft 5 for rotative movement relative thereto.

Bearings 23, which are positioned intermediate the ends of the outer propeller shaft 6, surround the outer propeller shaft 6 and are enclosed in a housing 24 therefor. The bearings 23 rotatably support the outer propeller shaft 6 on struts 25, which are connected to the housing 24 and incorporated in the frame structure, whereby the structure is additionally reenforced.

The engines 9 and 10 are drivingly connected to the propeller shafts 5 and 6, respectively, by pulleys 26 and 27, which are attached to the propeller shafts 5 and 6, and which are connected by belts 28 and 29 to corresponding pulleys attached to the drive shafts of the engines 9 and 10. The pulleys 26 and 27 are larger than the last mentioned pulleys, whereby the propeller shafts 5 and 6 are turned at slower rates of speed than the engines 9 and 10.

The engines 9 and 10 are positioned on opposite sides of the thrust plate 4, and face in opposite directions, whereby the propeller shafts 5 and 6 are adapted to be rotated in opposite directions. The engines 9 and 10 are supported on struts 30, which are connected to opposite sides of the thrust plate 4, and struts 31, which are connected to opposite sides of the transverse beam 16.

The struts 25, above mentioned, are each connected at one end to one of the struts 30.

The plane has a tail structure, indicated generally by the numeral 32, including flaps 33 whereby the flight of the plane is adapted to be controlled, mounted on the tube 3, rearwardly thereof, and has cables 34 controlling the action of the tail flaps 33 arranged within the tube 3 and extending forwardly from the tail structure 32.

The cables 34 advantageously may be passed over pulleys such as the pulleys 35. As shown in FIGURE 6, the pulleys 35 are mounted on a bracket 36 which is adapted to be removably inserted in an opening therefor in the tube 3.

A vertically retractable, freely turning propeller 37 is positioned above the fuselage 13, and is rotatable on a shaft 38 having the elongated tube 3, which comprises the principal structural member of the frame, suspended therefrom. The propeller 37, in its upwardly extending position, is rotatable about a vertical axis in response to the flow of air counter to the forward movement of the plane, whereby the plane is additionally supported in flight.

A piston 39, which is attached to the lower end of the shaft 38, is operable in a hydraulic cylinder 40 connected to the top side of a tubular fitting 41 surrounding the tube 3. The fitting 41 is rigidly connected to the tube 3, and is connected by struts 42 and 43 to the thrust plate 4 and the transverse beam 15, respectively. The shaft 38 is adapted to be retracted by the application of fluid pressure to the cylinder 40.

The propeller 37, in its retracted position, is received in an elongated recess 44 therefor in the top of the fuselage 13. A brake 45, which is positioned above the cylinder 40, acts on the shaft 38 to retard rotation of the propeller 37, whereby the propeller 37 may be aligned with the recess 44.

The invention may be modified in various ways without departing from the spirit and scope thereof.

What is claimed is:

An airplane structure comprising a frame including a principal structural member consisting of an elongated tube extending longitudinally of the plane, centrally thereof, a thrust plate arranged transversely of the tube, intermediate its ends, having an opening therein surrounding the tube and spaced radially apart therefrom, and structural members connecting the tube to the thrust plate, forwardly thereof, a pair of concentric, tubular propeller shafts surrounding the tube intermediate its ends, the ends of the inner propeller shaft extending beyond the adjacent ends of the outer propeller shaft, the inner propeller shaft extending rearwardly from a point forwardly of the thrust plate through the opening thereof, and the outer propeller shaft extending rearwardly from a point rearwardly of the thrust plate, bearings adjacent opposite ends of the inner propeller shaft, and intermediate its ends, supporting it on the tube for rotative movement relative thereto, bearings adjacent opposite ends of the outer propeller shaft, and intermediate its ends, supporting it on the inner propeller shaft for rotative movement relative thereto, bearings intermediate the ends of the outer propeller shaft rotatably supporting it on structural members carried by the thrust plate whereby the structure is additionally reenforced, thrust bearings on opposite sides of the thrust plate coacting with the respective propeller shafts whereby longitudinal thrust is adapted to be imparted to the thrust plate from the propeller shafts, separate engines mounted on structural members carried by the thrust plate, and positioned on opposite sides thereof, each having means drivingly connecting it to one of the propeller shafts, forwardly thereof, whereby the propeller shafts are adapted to be rotated in opposite directions, and a pair of propellers each mounted on one of the propeller shafts, rearwardly thereof.

(References on following page)

References Cited in the file of this patent

UNITED STATES PATENTS

| | | |
|---|---|---|
| 1,160,021 | Watson | Nov. 9, 1915 |
| 1,928,560 | Davis | Sept. 26, 1933 |
| 2,217,883 | Anderson | Oct. 15, 1940 |
| 2,581,320 | Burton et al. | Jan. 1, 1952 |
| 2,699,299 | Herrick | Jan. 11, 1955 |
| 2,740,595 | Bakewell | Apr. 3, 1956 |

FOREIGN PATENTS

| | | |
|---|---|---|
| 295,906 | Italy | May 3, 1932 |
| 493,173 | Great Britain | Oct. 4, 1938 |